Feb. 29, 1944. M. A. POWERS 2,342,891
PROCESS FOR SHEET GLASS MANUFACTURE
Filed Dec. 19, 1938
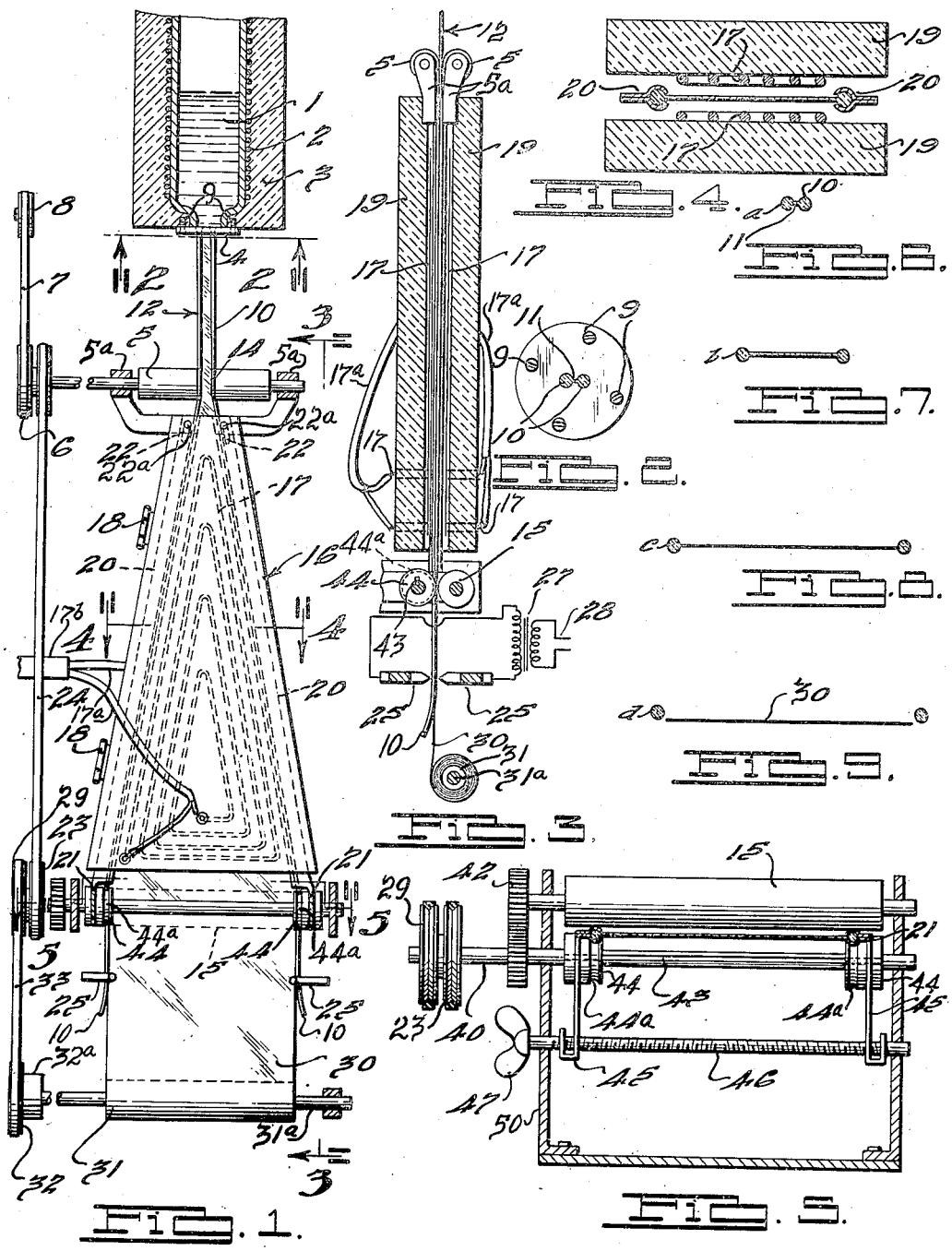
INVENTOR
Milton A. Powers Patented Feb. 29, 1944

2,342,891

UNITED STATES PATENT OFFICE 2,342,891

PROCESS FOR SHEET GLASS MANUFACTURE

Milton A. Powers, Detroit, Mich.

Application December 19, 1938, Serial No. 246,605

5 Claims. (Cl. 49—83.1)

This invention relates to a process for the manufacture of sheet glass of various thicknesses and has for one of its special objectives the production of glass in thin sheets having unusual characteristics.

Heretofore no practical and dependable process has been found for the production of glass in extremely thin sheets, which sheets have characteristics of flexibility, dielectric strength and other qualities which make them useful in numerous fields, as yet only partly realized. While my process is particularly suited for the continuous production of very thin sheets, having thicknesses even less than one thousandth of an inch which material I have termed "glass tissue," nevertheless the process is well adapted to the production of heavier glass. In fact, due to my special methods, glass having an especially smooth and even surface is obtained which has light transmitting qualities, without distortion, superior to glass produced by conventional methods.

An object therefore is to produce extremely thin glass by a continuous, economical method.

Another object is to produce such glass, as well as the heavier more conventional types of very high quality, with superior surface smoothness and even thickness.

A further object is to produce "glass tissue" in large volume rolled onto stock rolls within the flexibility limits of the glass, and the use of this base material for the production of laminated "glass mica," flexible glass, insulating sheet, and numerous other fabricated materials made possible by the novel characteristics of the glass tissue itself.

Still another object is an improved cutting method whereby the glass tissue is cut to size rapidly and accurately, without mechanical strain upon the material itself and yet producing a smooth fired edge of increased inherent strength.

Other objects will be apparent as the explanation progresses, and a better understanding will follow study of the figures.

Figure 1 is an elevation view, in partial section, of the continuous process and mechanism showing the flow of glass from the glass pot to the finished glass tissue.

Figure 2 represents a sectional view taken on the plane of line 2—2 of Figure 1.

Figure 3 is a view in partial section showing the ribbed section entering the feeder rolls, passing thru the reheat furnace, the stretcher rolls, the electric cutters, and the final collector roll, taken generally along the plane of line 3—3 of Figure 1.

Figure 4 is a cross section view taken at section 4—4 of Figure 1 showing the electric reheating furnace and the glass in process.

Figure 5 is a view of the adjustable stretcher rolls looking down on section 5—5 of Figure 1.

Figure 6 is a cross sectional view of the glass after it has issued from the melting pot, prior to stretching.

Figure 7 is a cross sectional view of the glass sheet of Figure 6 after partial stretching within the reheat furnace.

Figure 8 is a similar view of the glass after complete stretching.

Figure 9 shows the glass section of Figure 8 with its side ribs cut off after issuance from the reheat furnace.

Referring now to Figure 1 which is an elevation view of the glass tissue process in one of its preferred forms, we have a source of continuous glass supply 1 which is heated in this instance by electricity (from a source not shown) by heater coils 2, the whole being insulated by heavy refractory walls 3. The molten glass flows from the bottom of the pot thru the forming die 4 (which is shown in detail in Figure 2) partly due to gravity and partly thru the pulling action of feeder rolls 5—5, which are driven by pulley 6 thru belt 7 by an outside source of power 8.

Referring for a moment to Figure 2, the die is preferably constructed of vitreous refractory or of some metal not rapidly deteriorated by the drawing action of the molten glass. The die is held in place over the opening of the glass pot by suitable screw members 9. In order to practice my process it is necessary to start with a continuous ribbed web of glass which in the illustrated method is formed by the die opening. Preferably this is of a section consisting of two heavy outside ribs 10 with a comparatively short and thin connecting web 11. The glass as it passes from the die takes the form shown at 12 in Figure 1.

The drawing action of the rolls reduces the section proportionately in all dimensions before it enters the feeder rolls 5. These rolls may be provided with shallow grooves 14 corresponding to the ribs of the entering section as an aid to steady feed and for centering purposes, but the rolls themselves do not touch the web of the glass. Power source 8 is variable in speed so that the rate of feed can be adjusted to the requirements of the process. The glass as it leaves feeder rolls 5 has cooled sufficiently so that the ribs are relatively strong though flexible while the web, due to its thin section may be relatively hard.

Between the feeder rolls 5 and the stretcher roll 15 is placed a reheat furnace 16. This consists of two relatively wide and flat heating members, in this case shown with electric heating elements 17—17. One furnace face member is fixed, while hinges 18—18 allow the other member to be swung away for access purposes. Section views of the reheat furnace are shown in Figure 3 and Figure 4 where the heating elements are shown at 17 between the insulating walls 19—19. The ends of each of each heating wire emerge from the walls as shown, where they are insulated and surrounded by sheaths 17a—17a, which in turn pass into a conduit 17b for connection to a source of electricity.

As the glass section progresses from rolls 5 the ribs are loosely supported and guided by two edge conveyor members 20 which extend from the stretcher roll 15 where they are attached at 21—21 back almost to the feeder rolls 5 and are supported there by slots 22—22 which receive and slidably engage pins 22a—22a carried by the roll supports 5a—5a. These slots permit the guides to be adjusted as later described, without changing the vertical distance between the rolls 5 and 15. The heat of this furnace acts most rapidly upon the thin web of the glass softening it so that it may be stretched transversely as the section progresses downward. At the same time the heavy ribs absorb heat more slowly, remain relatively strong and support the web during this operation.

The widened section then enters the pass formed by the stretcher roll 15 and its associated parts (later described), which are driven by pulley 23 at the same relative speed as feeder rolls 5 thru belt 24. The actual speed of the glass past roll 15 may be higher than that thru rolls 5. In all such cases, and this is particularly important when making heavy sections, we obtain a double drawing action, lengthwise and at right angles to the principal direction of motion simultaneously which produces an extremely flat and even surface in the finished product.

After passing roll 15 the ribs are cut from their web by two sets of high voltage electric arcs shown at 25—25. These arcs as shown in Figure 3 consist of two electrodes 25 on opposite sides of the glass web. High voltage current is supplied by the secondary of the transformer 27, which receives its primary power from an outside power source 28 not shown.

In actual practice I have found that a high voltage transformer supplied by a 110 volt sixty cycle source and having an output of 14000 volts at 30 milli-amperes is suitable for energizing one set of cutting electrodes. The electrodes may be made from one-eighth inch diameter nichrome rods supported on suitable fixed insulated members with points spaced one-eighth inch apart, between which the glass to be severed moves. The high voltage readily establishes an arc between the electrodes even with the glass tissue intervening and will continuously cut the glass by instantaneous melting. The edge of the glass so cut is smooth, free from any edge crazing or cracking inherent in mechanical cutting methods, and actually is strengthened somewhat from the firing action of the arc.

The above-described transformer is capable of cutting tissue up to approximately five thousandths inch thick. For heavier material or where the cutting speed is high, it will be necessary to provide more capacity by increased amperage in the secondary current, although the voltage specified should be ample. As the cutting action by my method is entirely dependent upon the melting ability of the arc, more heat must be supplied for increased capacity. In turn the heating ability of a high voltage arc varies as the square of the current in that arc. Hence, doubling the amperage will theoretically give four times the cutting capacity. While this cannot be obtained in actual practice, still any increase in current output will improve or speed the cutting action.

As the ribs 10 of Figure 1 are cut away they go to scrap for later remelting while the thin glass tissue 30 is reeled upon collector roll 31, which is powered by pulleys 29 and 32 thru belt 33. Pulley 32 is preferably connected to the shaft 31a of roll 31 by a friction drive 32a, set to roll up the tissue without excessive strain.

Detailed construction of stretcher roll 15 and its associated parts is shown in Figure 5. Power is supplied by pulley 23 to drive shaft 40 which in turn is geared to smooth roll 15 by gears 42. Shaft 40 is provided with a keyway 43 which serves to drive the two slidable rolls 44—44. The longitudinal positions of these rolls 44 are fixed by the action of yokes 45—45 which are moved by the lead screw shaft 46. Shaft 46 is divided with two opposing threads, one on each half of the length. Thus rotation of thumbscrew 47 serves to move the two rolls 44 toward or away from each other as desired, while they are rotated about the shaft 43 in unison with roll 15. These various shafts and devices are supported by a framework 50.

Pivoted attachment of the two conveyor members 20 (Figure 4) is made to yokes 45 as shown at 21—21. Thus the conveyors maintain proper position at all times to feed the ribs directly onto the grooves 44a of rolls 44, regardless of their spacing. The cross-sectional shapes of the members 20 are such as to receive the ribs 10 of the glass section in sliding support to guide them between rolls 5 and rolls 44, the ribs then being guided downwardly by the grooves 44a. As rolls 44 are spaced farther apart, conveyors 20, by retaining a sliding grasp upon the glass rib, serve to supply part of the transverse force necessary to stretch the glass web at right angles to its direction of travel.

Figures 6 to 9 show various sections of the glass as it progresses. Section (a) shows the glass section as it leaves the die (Figure 2) with the two heavy ribs 10 between which is connecting web 11. At (b) the ribs are farther apart though of the same size while the web is correspondingly thinner. At (c) the web is fully drawn to its desired thinness while at (d) the web 30 which now forms the finished glass is cut from the ribs.

The finished glass tissue may be of any desired thinness depending upon its ultimate use. There are no limitations in my drawing process insofar as tissue thinness is concerned, if the operations are performed with due consideration given to the natural characteristics of the material in such dimensions. For example, if the web between the ribs as it enters the first rolls has a length of ½" and a thickness of $\frac{1}{32}$", and is drawn transversely to a width of 6 inches in the finished tissue, the thickness will average .0006". It is evident that accurate control of thickness is readily possible with my method and a wide range of thicknesses and widths of final product practicable. Furthermore, when the process is under way in producing material of a given thickness the control is such that large quantities may be made continuously without appreciable variation in dimensions.

Especial attention is called to the fact that the web portion of the glass during processing at no time comes in mechanical contact with any part of the rolls or machining. This insures a perfect surface finish to the glass, an essential characteristic of glass tissue which cannot be obtained by any known mechanical rolling process. Also, by attention to the rate of reheating applied to the web, and care to procure an even heating across the width, an extremely smooth surface of even thickness is assured. Furthermore, it will be apparent that the direction of all drawing of the glass is limited to a single plane, all forces acting upon the glass are in that plane and consequently a perfectly flat glass tissue results. This is in sharp contrast to the tissue produced by the blowing methods used heretofore.

The glass tissue of my process is particularly adapted for assembly into new products whose usefulness have awaited the availability of suitable materials. The recent rapid development of glass insulation for wires used in electrical motor windings has enabled motors to operate at much higher temperatures now limited by the organic sheet insulating paper conventionally used. Likewise the insulation of high voltage coils depends upon organic papers and insulating cloths, or the more expensive mica.

By assembly of a multiplicity of layers of my glass tissue with or without cement, it is readily possible to produce a material having high electrical and heat resistance. The laminated sheet lends itself to flexing without breakage. Furthermore, as each sheet of glass tissue is very large and without openings for electrical leakage, it produces a maximum electrical strength for a given thickness in comparison with other available materials. Just as in the case of glass fibers which become extremely flexible in diameters under one thousandth of an inch, so my glass tissue in extremely thin sheets will have a variety of applications, probably even for wrapping and sealing purposes where resistance to moisture, atmospheric conditions, or high temperatures is desired.

Mention was made earlier to the use of the principles of my process in the manufacture of heavy glass of superior visual transparency. In other words, it is probable that window glass drawn by a modification of my process already described will be substantially free from the visual distortion common to such glass. Furthermore, in the heavier grades, the visual quality of a plate glass may be obtained without the need for the expensive steps of grinding and polishing.

In my process also every effort is made to reduce if not entirely eliminate mechanical rolling of the glass, or touching it mechanically while in a viscous condition. Examination of glass produced by the usual continuous process shows the effect of elongation in the direction of drawing, which manifests itself in a variation in thickness transversely and a tendency for the glass to be wavy in the same direction. Basically speaking my process overcomes these shortcomings by stretching the glass sideways at the same time that it is stretching lengthwise, thus producing a perfectly flat and even sheet. Upon further cooling the rib edges are removed and the sheet cut to usable size.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A process of the character described for the manufacture of sheet glass, consisting in the extrusion of molten glass in such manner as to provide a rib at each side of the sheet and thereafter guiding said ribs divergently through laterally spaced stationary channels diverging from each other in the direction of travel of the sheet while drawing it away from the source of molten material.

2. The process of converting a molten or plastic strip of glass or the like into a much thinner sheet of much greater width, consisting in providing the strip with thickened side edges while it is in a soft condition, starting to separate said edges and stretch the strip laterally when the material has become relatively congealed in said thickened edges and harder between said edges while simultaneously stretching the strip longitudinally, and continuing to separate said edges while heating only the thinner sheet material therebetween to permit it to continue to stretch.

3. In the process of claim 2, drawing said sheet with said thickened edges disposed slidably in divergent guide channels to thereby cause said lateral stretching.

4. A process for the continuous formation of strip tissue from glass, comprising the steps of drawing the strip from a bath of molten glass while simultaneously enlarging the edges of the strip and winding it into a roll at a point relatively remote from the bath, while slidably guiding said enlarged edges divergently to cause lateral stretching of the strip during its passage from the bath to the winding point, and trimming off the edges of said strip just as it reaches said winding point so that it can be wound in the form of a ribbon of uniform thickness.

5. A process of glass tissue manufacture comprising the steps of drawing the material in relatively narrow and thin strip form from a molten bath and thereafter, prior to final chilling of the withdrawn material, separating the edges of said strip to stretch the latter transversely until it is many times as wide and has the flexibility of a thin sheet of paper, said drawing and separating steps comprising first forming enlargements on the edges of the strip as it emerges from the bath, and then guiding said enlargements along divergent lines through a distance sufficient to obtain the desired final cross-sectional shape of the product.

MILTON A. POWERS.